Dec. 12, 1961   J. L. OTTERS   3,012,314
METHOD OF MAKING A WORK HOLDER
Original Filed Feb. 26, 1954   5 Sheets-Sheet 2

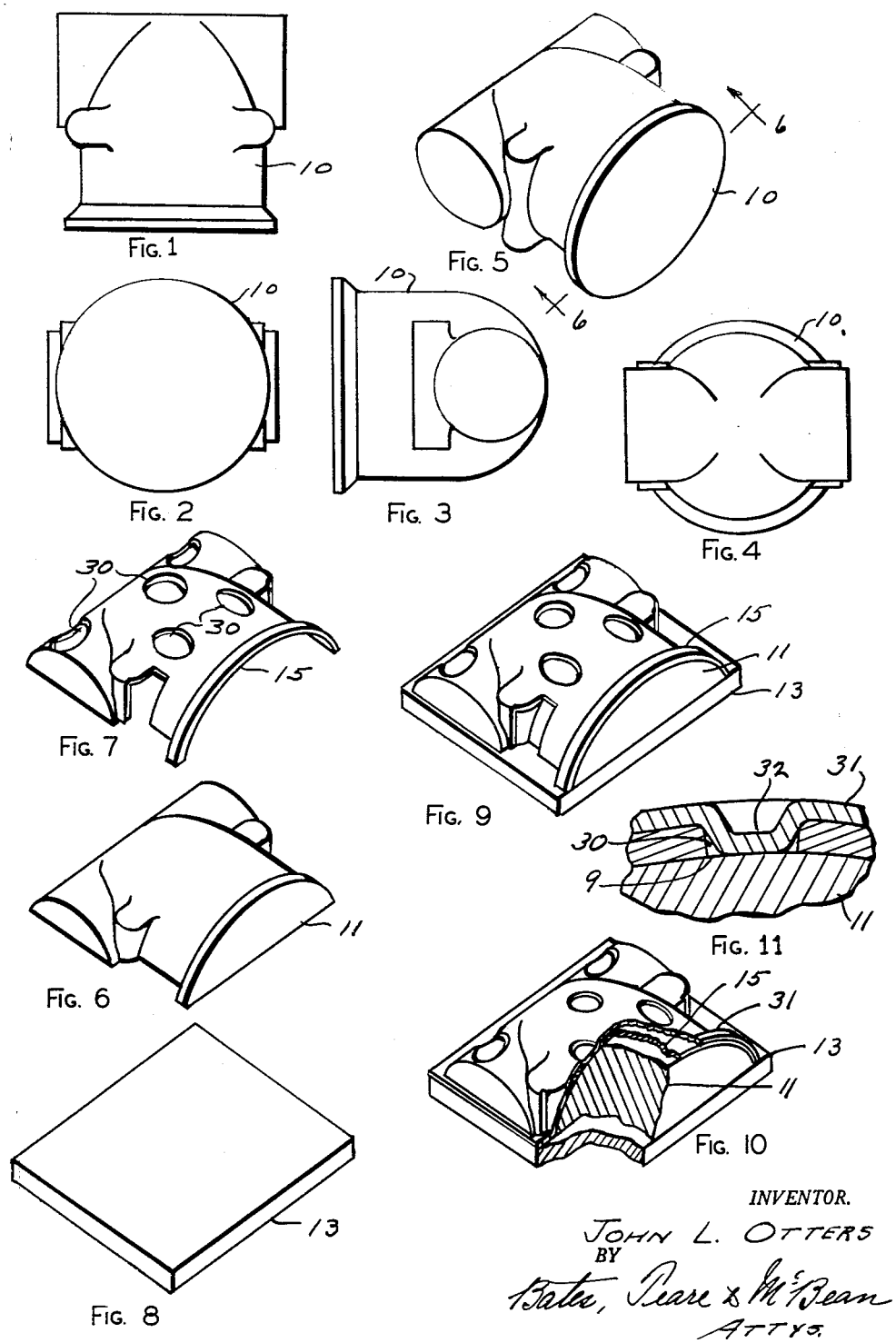

INVENTOR.
JOHN L. OTTERS
BY
Bates, Peare & McBean
ATTYS.

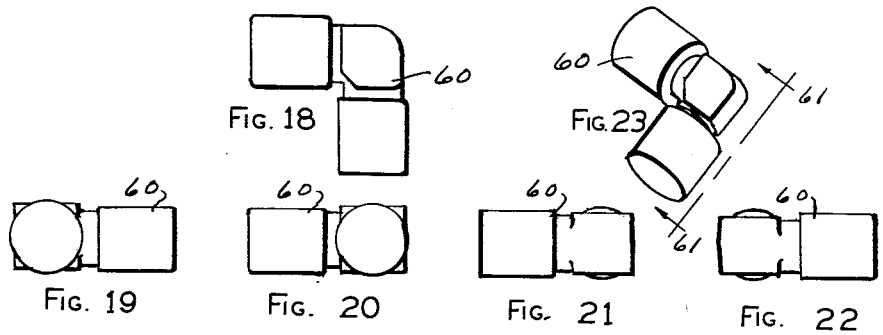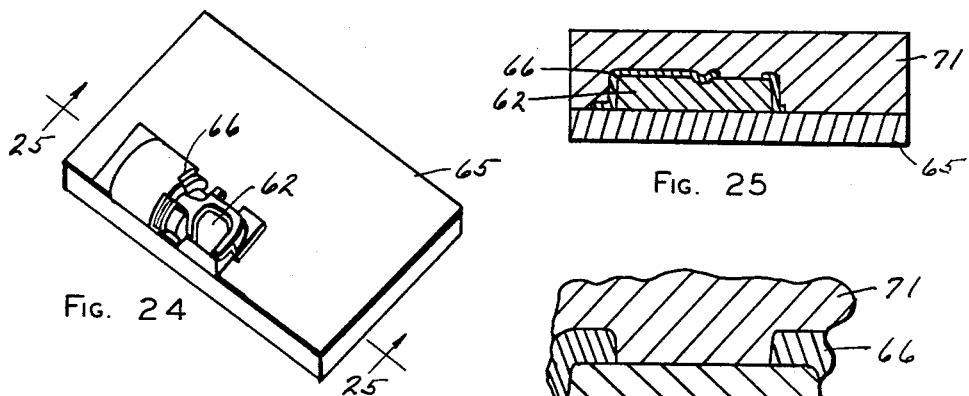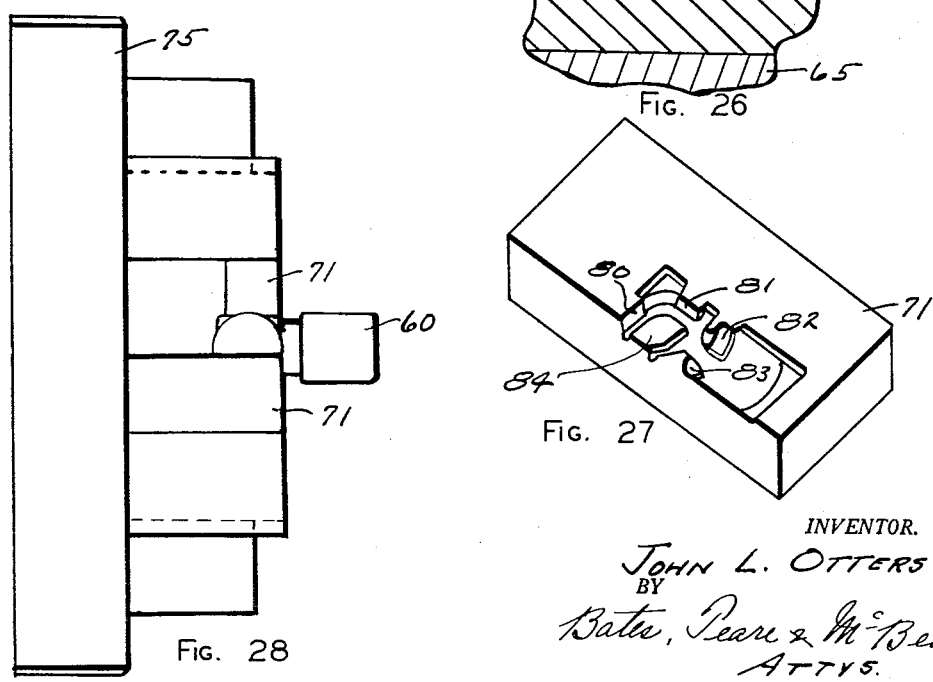

Dec. 12, 1961  J. L. OTTERS  3,012,314
METHOD OF MAKING A WORK HOLDER
Original Filed Feb. 26, 1954  5 Sheets-Sheet 5

INVENTOR.
JOHN L. OTTERS
BY
Bates, Teare & McBean
ATTYS.

United States Patent Office 3,012,314
Patented Dec. 12, 1961

3,012,314
METHOD OF MAKING A WORK HOLDER
John L. Otters, 5739 E. 139th St., Cleveland, Ohio
Original application Feb. 26, 1954, Ser. No. 412,761. Divided and this application Jan. 2, 1958, Ser. No. 706,838
6 Claims. (Cl. 29—423)

This invention relates to a method of making work holders, and particularly to holders which are adapted to be used for holding a work piece so that it may be subjected to a machining operation.

Work holders of this character are used for example in the chuck of a turning machine such as a lathe or drill press, milling machine, grinder or the like. The holder may also be used in a clamp of any kind which is suitable for holding a work-piece in position to permit operations to be made upon it. The invention is particularly suited for holding work-pieces which have a curved or irregular surface.

Heretofore, various attempts have been made to accomplish a satisfactory holder for a curved surface, but they are subject to objections and disadvantages hereinafter enumerated. One such method has required the machining of it from a block of metal. In some instances the holding block is made prior to the formation of the work-piece in production, wherefore it is necessary to make the holder by working from drawings of the work-piece. To do this, it is necessary to design the holder working from the dimensions on the print or to calculate them from a known reference point. Thereafter, the holder is either machined to correspond to the design, or is made of cast metal. A disadvantage of the latter proposal is that it is necessary first to make a pattern from the drawing and then to make a mold and cast the metal. These steps introduce error to such an extent that the finished surface of the work-piece may not correspond precisely to the dimensions of the print. The resulting accumulation of error necessitates considerable time to rework and to fit the work-piece to the holding block. Additionally, for some irregular pieces, considerable time is required to design the holder and frequently the machined surfaces of the holding block do not conform exactly to the shape of the work-piece, thus resulting in objectionable point or line contact instead of area contact between the work-piece and holder. Moreover, the work-piece is frequently marred at the points of contact.

A second method of making a holding block has embodied the machining of the block in a duplicating machine. This is usually performed in a milling machine which is equipped with a duplicating attachment. Usually a master die is first made and is used for directing the path of a follower which in turn controls the movement of the cutting tool. The objection to this method is that if a large radius cutter is used the detail of the master impression is poorly copied, while on the other hand, if a small radius cutter is used, then many passes are required to duplicate the detail of the master die impression. Additionally, the accuracy of duplication is subject to error in the transfer of motion from the follower to the milling machine table.

A third method of making a holding block embodies the casting of it in a metal mold. This is usually accomplished by splitting the work-piece and then mounting the split section upon a plate. The plate is then inserted into a mold and molten metal is poured into it thus forming the block by a casting process around the surface of the work-piece. An objection to this method, however, is the fact that the metal used is softer than the work-piece and that the life of the holding block is greatly shortened. Moreover, due to the softness of the metal, variations in the shapes and size of the work-piece—resulting from the slight variations incident to production—cause the impression in the holding block to become larger thereby decreasing the clamping ability of the holding block.

An object of the present invention is to provide a method of making a work holder which will overcome all of the foregoing objections and which will possess certain advantages, as follows:

(1) The engagement between the work-piece and the holder will be effected at a number of preselected areas of contact which conform precisely to the shape of the work-piece at such areas.

(2) The holding block will have a work-engaging face of relatively high strength material which is attached to a back-up block of a softer or lighter material. The use of a lighter construction reduces the momentum of a rotating head resulting in the accomplishment of a higher cutting speed.

(3) The liner or facing sheet of the holder is fastened by a resilient bonding material to the back-up block thus reducing vibration or chatter of the work-piece and resulting in the attainment of a smoother surface by the cutting tool during the machining operation.

(4) The method eliminates the necessity for hand fitting and results in uniform distribution of pressure between the holder and the work-piece.

Briefly, the foregoing objects are accomplished either by a stamping or forging operation. In the stamping operation a thin sheet of high strength metal is formed around the work-piece to be held. This may be accomplished by cutting one specimen of the work-piece in half and forming the thin sheet around it. Thereafter, openings are made in the sheet at preselected areas and, thereupon, the sheet is placed over the half-section and mounted upon a flat plate. This assembly is then used for the formation of a second sheet which conforms to the contour of the first sheet, and which has portions of it entering the openings formed in the first sheet. The second sheet thus has bosses projecting therefrom at spaced areas corresponding to the location of the openings previously formed in the first sheet. The second sheet is then attached to a back-up block, as by a cementitious material, which includes a resilient bonding material, thereby resulting in the finished holder which when placed in the chuck of a turning machine with another holder suitably formed to conform to the opposite side of the work-piece operates to securely grip it uniformly and securely.

The second method of making the work holder in accordance with the present invention embodies the formation of a first plate as aforesaid in conformation to the shape of the work-piece, and then formation of suitable openings at preselected locations, as aforesaid, and thereupon the sheet and half section are rigidly fastened to a flat plate as by grazing or soldering. The assembled unit is then placed in one head of a press, the opposite head of which carries a block of high strength material which is heated to a forging temperature and then the heads are brought together, thereby forming a die cavity in the heated block. Afterwards, the block so formed is suitably heat-treated and constitutes the work-engaging holder which can be suitably fastened in a chuck or other clamping device.

This application is a division of application Serial No. 412,761, filed February 26, 1954, now abandoned.

Referring now to the drawings,

FIG. 1 is a top plan view of a work-piece which is intended to be held by a work holder embodying the present invention;

FIG. 2 is a front elevation of the work-piece;

FIG. 3 is a side elevation as viewed from the right of FIG. 1 (the work-piece being symmetrical);

FIG. 4 is a rear elevation of the work-piece;

FIG. 5 is a perspective view of the work-piece;

FIG. 6 is a perspective view of a half-section of the work-piece cut on a plane indicated by the line 6—6 in FIG. 5;

FIG. 7 is a perspective view of a plate which is shaped to conform to the surface of the half-section shown in FIG. 6.

FIG. 8 is a perspective view of a flat plate which is used to complete an assembly;

FIG. 9 is a perspective view showing the assembly of section, sheet and plate of FIG. 6 to 8 inclusive;

FIG. 10 is a perspective view, partly broken away, showing the formation of a second plate over the assembly of FIG. 9;

FIG. 11 is an enlargement of a portion of the assembly of FIG. 10 and illustrating the manner in which the second sheet is formed over the assembly of FIG. 9;

FIG. 18 is a top plan view of another form of work-piece;

FIG. 19 is a side elevation taken from the left hand side of FIG. 18;

FIG. 20 is a front elevation of the work-piece of FIG. 18;

FIG. 21 is an elevation taken from the right-hand side of FIG. 18;

FIG. 22 is an elevation taken from the rear of FIG. 18;

FIG. 23 is a perspective view of the work-piece of FIGS. 18 to 22 inclusive;

FIG. 24 is a perspective view of an assembly embodying a sheet which is formed around a half section of the work-piece shown in FIG. 23 in accordance with the method illustrated in FIGS. 1 to 9 inclusive;

FIG. 25 is a section taken through a block which is formed by the assembly of FIG. 24 and taken particularly on a plane indicated by the line 25—25 of FIG. 24;

FIG. 26 is a sectional detail enlargement of a portion of the assembly of FIG. 25;

FIG. 27 is a perspective view of the forged block (constituting the upper block of FIG. 25);

FIG. 28 is a front elevation of a chuck having holding blocks similar to that illustrated in FIG. 27 attached thereto for holding the piece illustrated in FIG. 23;

Figure 12:
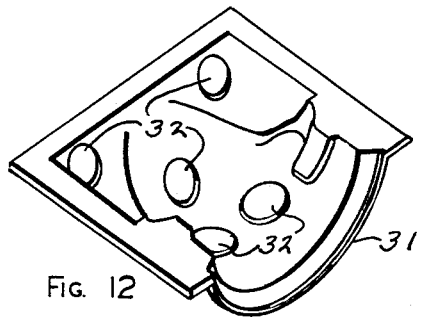
FIG. 12 is a perspective view of the second plate illustrated in FIG. 10 but removed from the assembly and inverted with respect to the position shown in FIG. 10.

Referring first to the formation of a holder which is made by the stamping process, and using for illustration the work-piece 10 shown in FIGS. 1 to 5 inclusive, the first step in the method comprises the severing of the work-piece into a half section designated 11 in FIG. 6, this being cut on a plane indicated by the line 6—6 in FIG. 5. The half-section so formed is then fastened to a plate 13 by any suitable method, such as soldering, or bolting, and thereupon a sheet 15 is formed by a pressure operation around the top surface of the half section 11. This may be accomplished for example in the press illustrated in FIG. 29 which has a lower press head 20 and an upper press head 21 arranged to be moved toward and from each other by means of a hydraulic ram 22. Thus, for example, the lower head which is movable with respect to the press frame 25 has an extension 26, the interior of which is shaped to receive the plate 13 with the half-section 11 mounted thereon. Thereupon a blank sheet 15 may be placed over the part 11 and then a block 27 of material, such as lead, may be placed above the sheet 15. Then, as the ram 22 is operated to move the assembly against the head 21, the sheet 15 is shaped to conform to the formation of the part 11. After the sheet 15 is removed from the press, openings 30 are formed therein at spaced pre-selected areas where it is desired to make contact between the work-piece and the work holder.

Figure 29:
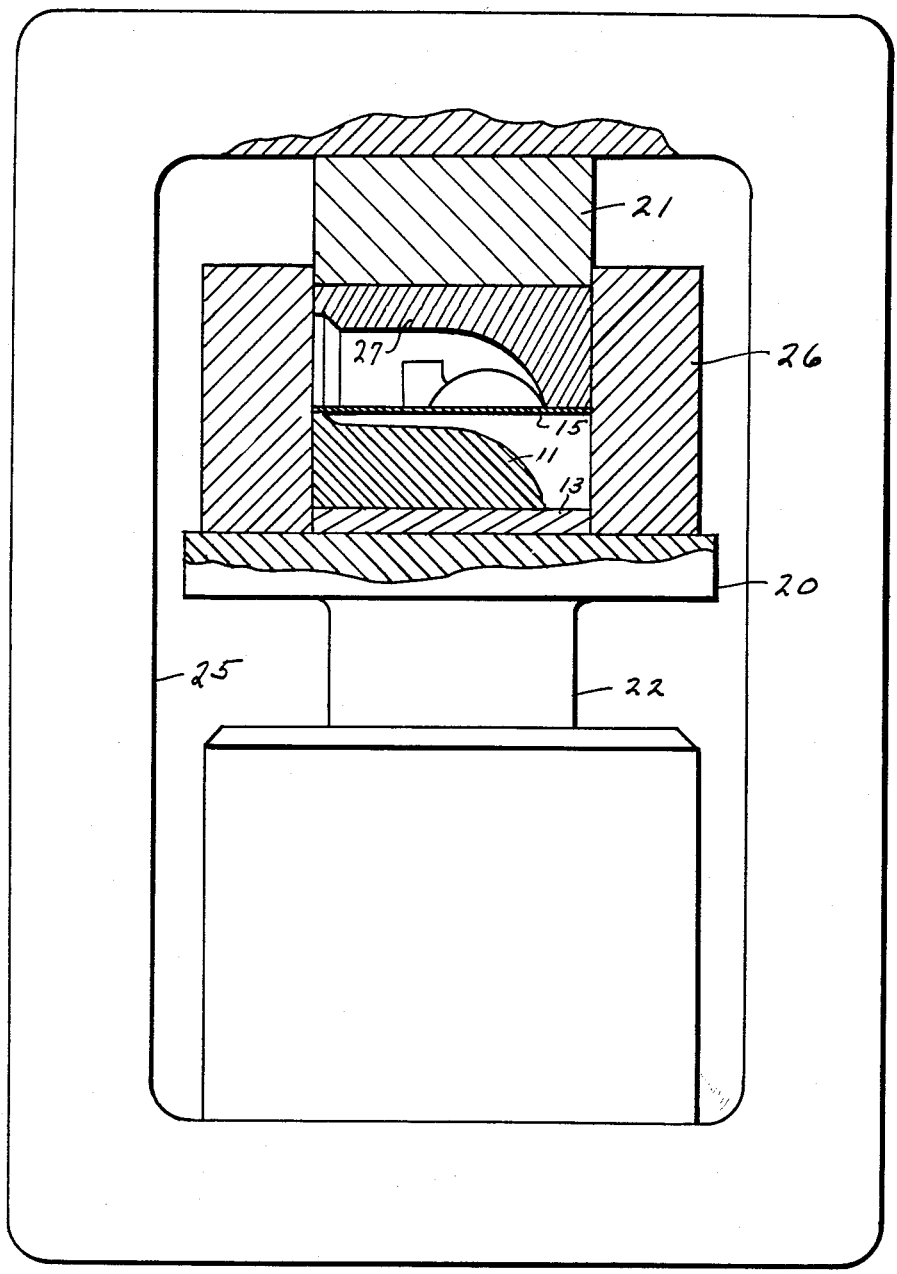
FIG. 29 is a front view, partly in section, illustrating a press which is used for forming sheets shown in FIG. 7, FIG. 10 and FIG. 24.

The next step in the method is the formation of a second sheet 31 over the sheet 15 by using the press illustrated in FIG. 29 in which case the blank for the sheet 31 is placed within the press above the assembly of plate 13, half-section 11 and sheet 15, the latter having the openings 30 cut therein. Upon operation of the press, the sheet 31 partakes of the formation of the sheet 15 with portions of the sheet 31 entering the openings 30 to form bosses 32. This is best illustrated in FIG. 12 where the sheet is removed from the press and shown in inverted position.

Figure 13:
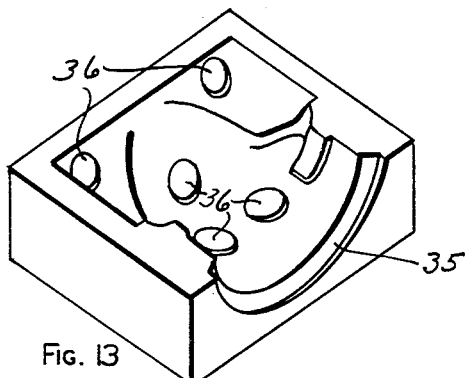
FIG. 13 is a perspective view of a back-up block which is used with the sheet of FIG. 12.
Figure 15:
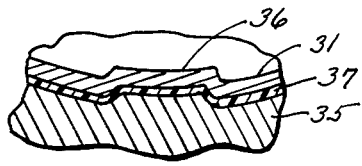
FIG. 15 is an enlargement of a portion of the assembly of FIG. 14.
Figure 31:
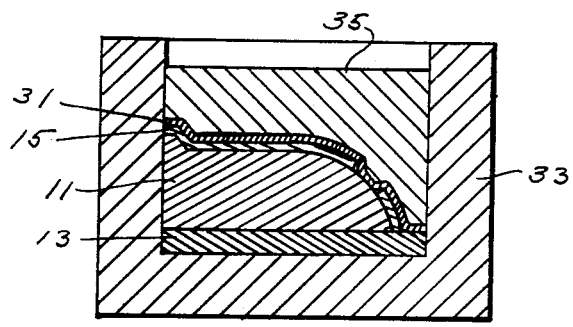
FIG. 31 is a vertical section through a mold flask which is used for forming the back-up block of FIG. 13.

After the formation of the sheet 31 as aforesaid, the entire assembly of FIG. 10 is placed within a mold shown in FIG. 31 and molten metal is poured therein so as to form the back-up block 35 which is illustrated in FIG. 13. Thus, the block has bosses 36 which correspond to the bosses 32 in the sheet 31 and which interfit therewith whenever the sheet is placed within the back-up block. In practice, the sheet 31 is cemented to the block 35 by means of an adhesive 37 which includes a resilient material, such as a rubber compound, thus providing a slight resiliency whenever clamping action is exerted against the assembly of FIG. 14 after it has been placed in a clamp holder. An adhesive suitable for this purpose is one which is presently being sold by the B. F. Goodrich Company under the trademark "Plastilok." Preferably the bonding material forms a thin layer over the entire inter-fitting surfaces of the sheet 31 and block 35.

Figure 14:
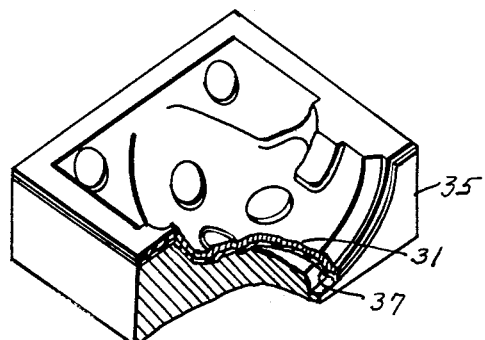
FIG. 14 is a perspective view showing an assembly of the sheet 12 to the back-up block of FIG. 13.
Figures 16, 17:
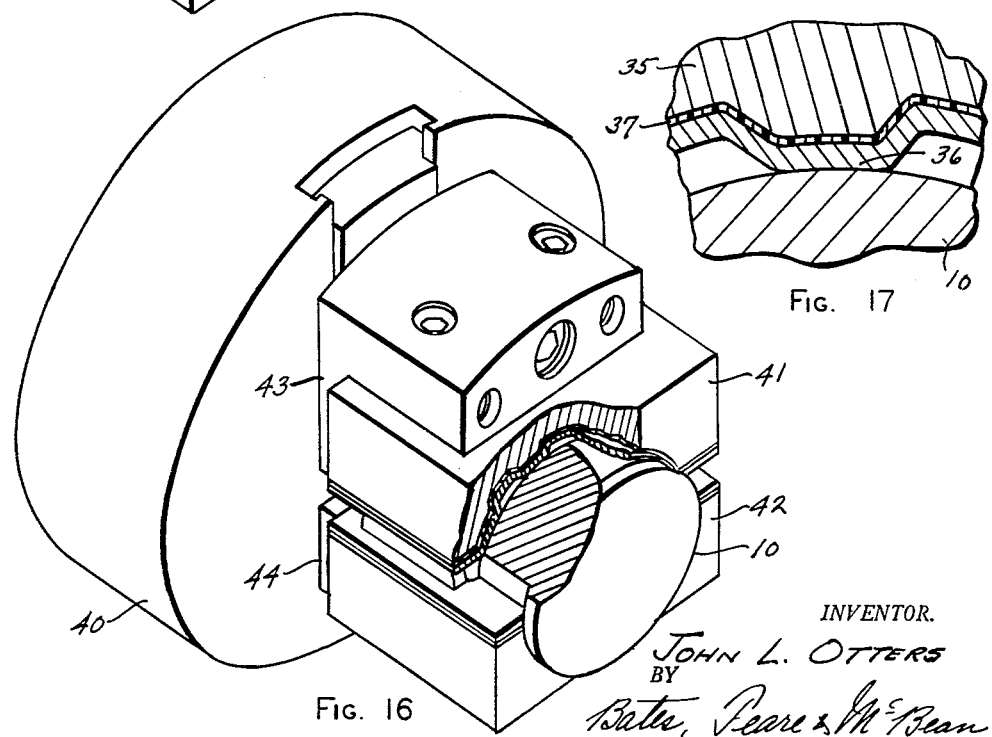
FIG. 16 is a perspective view of a chuck having work holders embodying the present invention attached thereto and utilized for holding the work-piece illustrated in FIG. 5.
FIG. 17 is an enlargement showing a portion of the work-piece and work-holder particularly at the point of contact between the two.

In FIG. 16, I have shown a chuck 40 as having a pair of holding blocks assembled as in FIG. 14 and indicated at 41 and 42 respectively as being clamped to the chuck by means of adaptors 43 and 44 respectively. Inasmuch as the work-piece of FIG. 5 is symmetrical, it is only necessary to make a second holder corresponding to the holder 41 and to use them in opposing relationship to clamp the work-piece 10.

FIG. 11 illustrates the manner in which the bosses 32 on the sheet 31 are formed to enter the openings 30 in the sheet 15 while FIG. 17 shows the manner in which the bosses 32 engage the surface 9 of the work-piece 10, from which it may be seen that contact is effected between each boss 32 and the work-piece upon an area which is exactly complementary to the surface of the work-piece.

Figure 30:
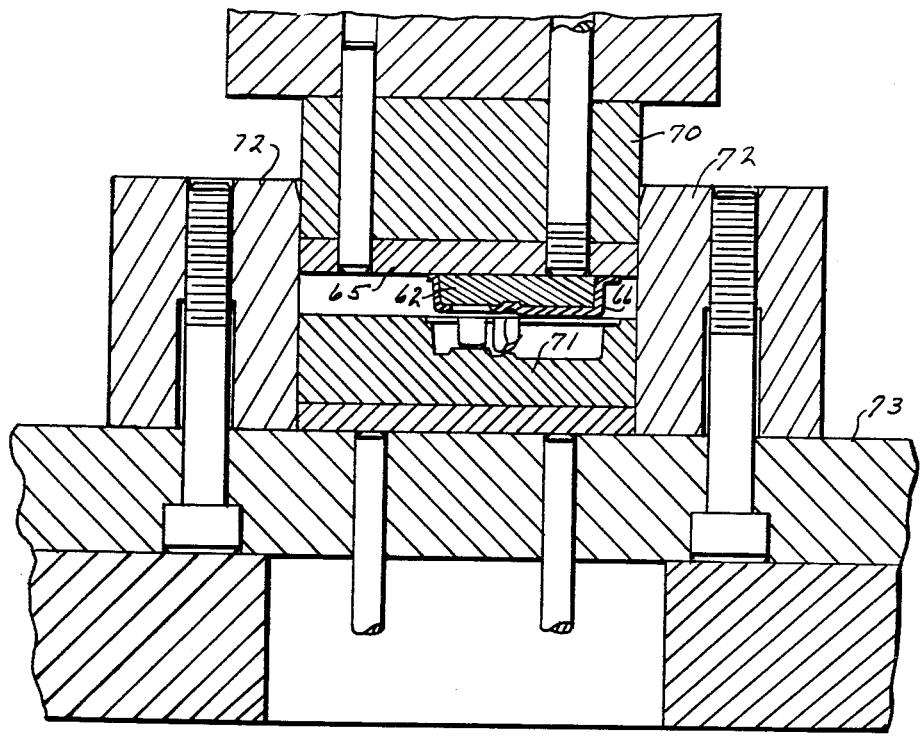
FIG. 30 is a vertical section through a press which is used for forming the block in the assembly of FIG. 25.

A modification of my invention is illustrated in FIGS. 18 to 28 wherein the forging process may be used for forming the clamping surface of the work holder, and in these illustrations, I have shown a work-piece indicated in general at 60 which again is a symmetrical piece. To carry out this process a half-section 62 is cut along the plane indicated by the line 61—61 in FIG. 23 and is fastened, as by welding, or brazing, to a plate 65. Thereupon, a sheet 66 formed in the same manner as the sheet 15, as aforesaid, is placed over the half-section 62 and fastened thereto as by brazing. The assembly of FIG. 24 may then be fastened to the head 70 of a press shown in FIG. 30, while a block 71 of heated metal may be placed within an extension 72 of the lower press head 73. Upon operation of the press the top surface of the block 71 has formed therein a cavity which is complementary to the formation of the sheet 66.

The block 71 may then be suitably heat treated to harden the working surface, and the block then constitutes the work holder. One such holder is shown for example in perspective view in FIG. 27, and inasmuch as the work-piece 60 is symmetrical, it is only necessary to make another block corresponding to the shape of that designated 71 and then to mount them within a suitable chuck 75, as shown in FIG. 28. In this form of holder the contact areas between the holder and the work-piece are indicated at 80 to 84 respectively. These are pre-selected areas which serve to effectively grip the work-piece and hold it against movement with respect to the holder.

A method of making a work holder made in accordance with the present invention is advantageous in that a greater degree of accuracy can be obtained without the accumulation of error experienced in the formation of previous work holders while at the same time a hardened work surface is obtainable at a relatively low cost. The invention eliminates the necessity for making designs and patterns and reduces the manufacturing operation to a minimum. In addition, the invention is well suited for the formation of a work holder which corresponds to any configuration of work-piece which can be cast.

I claim:

1. A method of making a work holder comprising pressing a blank of sheet material into engagement with a portion of a work-piece to be held, until the sheet is complementary to the contour of said portion, removing the sheet from the work-piece, forming holes at pre-selected spaced locations in the sheet while it is separated from the work-piece, placing the sheet into re-engagement with the work-piece, pressing a second member into engagement with the surface of said sheet while it is asesmbled onto the work-piece until said member is complementary to the contour of the sheet, causing portions of said member to enter the respective holes in the sheet and to engage the underlying surface of the work-piece, thereby forming bosses which are complementary to the contour of the work-piece and which are defined by the pre-selected areas of said holes and then separating the second member from the assembly consisting of the work-piece and said sheet.

2. A method of making a work holder according to claim 1 wherein the second member comprises a sheet of material and wherein a back-up block is affixed thereto after the second sheet has been separated from the assembly of the work-piece and the first sheet.

3. A method of making a work holder according to claim 1 wherein the second member comprises a heated metallic block.

4. A method of making a work holder according to claim 2 wherein the back-up block is molded onto the sheet by a casting operation while the second sheet is positioned on the assembly of the work-piece and the first sheet.

5. A method of making a work holder according to claim 1 wherein the second member is a block of metal into which a cavity is formed by a forging operation, using the assembly of the work-piece and the sheet as a punch, after which the block when separated from the assembly is hardened on the work engaging surface thereof.

6. A method of making a work holder according to claim 1 wherein the work-piece comprises a half-section of the work-piece to be held, and wherein the half-section is mounted upon a supporting plate with the plane surface of the section in contact with the plate thereby presenting to said sheet the contoured surface of the work-piece to which the sheet is to be made complementary.

References Cited in the file of this patent

FOREIGN PATENTS 705,856     Germany _____ May 12, 1941